(12) United States Patent
Cheliotis et al.

(10) Patent No.: US 7,546,258 B2
(45) Date of Patent: Jun. 9, 2009

(54) METHOD AND DEVICE FOR CALCULATING A FORWARD PRICE FOR USING LINKS IN A NETWORK

(75) Inventors: Georgios Cheliotis, Zurich (CH); Christopher M. Kenyon, Langnau (CH)

(73) Assignee: International Business Machines Corporation, Armonk, NY (US)

( * ) Notice: Subject to any disclaimer, the term of this patent is extended or adjusted under 35 U.S.C. 154(b) by 1082 days.

(21) Appl. No.: 10/475,619

(22) PCT Filed: Apr. 2, 2002

(86) PCT No.: PCT/IB02/01184

§ 371 (c)(1),
(2), (4) Date: Jul. 15, 2004

(87) PCT Pub. No.: WO02/085044

PCT Pub. Date: Oct. 24, 2002

(65) Prior Publication Data

US 2005/0021430 A1    Jan. 27, 2005

(30) Foreign Application Priority Data

Apr. 18, 2001    (EP) ................................. 01109572
Jul. 30, 2001    (EP) ................................. 01118238

(51) Int. Cl.
    *G06F 17/60*    (2006.01)
(52) U.S. Cl. ........................................... 705/35
(58) Field of Classification Search .................... 705/35
    See application file for complete search history.

(56) References Cited

U.S. PATENT DOCUMENTS

| 6,546,375 B1 * | 4/2003 | Pang et al. ..................... 705/37 |
| 2002/0073013 A1 * | 6/2002 | Haddad ........................ 705/37 |
| 2002/0138398 A1 * | 9/2002 | Kalin et al. ................... 705/37 |

(Continued)

OTHER PUBLICATIONS

Elyes Jouini, Martingales and Arbitrage in Securities Markets with Transaction Costs, Mar. 27, 1992, Journal of Economic Theory, vol. 66, pp. 178-197.*

(Continued)

*Primary Examiner*—Alexander Kalinowski
*Assistant Examiner*—John O Preston

(57) ABSTRACT

The invention relates to a method for calculating in a network that comprises links a joint distribution of forward prices for using the links in the network. The method comprises the following steps:

a) a provision step for providing an observed forward price of a forward contract for each of the links,
b) a determination step for deriving from the observed forward prices a proposed joint distribution of forward prices by applying a forward pricing process to each of the links, thereby generating a geographical arbitrage in the network;
c) an arbitrage reduction step for reducing the geographical arbitrage in the proposed joint distribution of forward prices by a geographical arbitrage reduction value;
d) a verification step for verifying if the proposed joint distribution of forward prices together with the observed forward prices has a defined property in response to the determination step and the arbitrage reduction step;
if the verification step results in the defined property being not present
e) a generation step for generating a property reduction value; repeating the determination step, the arbitrage reduction step and the verification step, applying the property reduction value to the forward pricing process of each of the links.

1 Claim, 4 Drawing Sheets

U.S. PATENT DOCUMENTS

2003/0208433 A1* 11/2003 Haddad et al. ................ 705/37

OTHER PUBLICATIONS

Michaela Manoliu and Stathis Tompaidis, Energy Futures Prices: Term Structure Models with Kalman Filter Estimation, Oct. 10, 1998.*

Elyes Jouini, Martingales and Arbitrage in Securities Markets with Transaction Costs, Mar. 27, 1992, Journal of Economic Theory, vol. 66, pp. 178-197.*

Michaela Manoliu and Stathis Tompaidis, Energy Futures Prices: Term Structure Models with Kalman Filter Estimation, Oct. 10, 1998.*

Chiu S S et al: "Surprising Pricing", Risk, Bandwidth Special Report, Jul. 2000, pp. 12-14, XP002205210, the whole document.*

Reiman M I et al: "A Simple Solution to a Bandwidth Pricing Anomaly", Technical Memorandum, Bell Laboratories, Lucent Technologies, 'Online! Feb. 2001, XP002205474 (url: http: //cm.bell-labs.com/who/wim/papers/bandwidthpricing/). The whole document.*

WO OO 54198 A (Morgan Stanley Dean Witter & Co) Sep. 14, 2000, p. 9, line 9-p. 19, line 10.*

Cheliotis G: "Bandwidth trading in the real world: findings and implications for commodities brokerage" IBM Research Report RZ 3244, Dec. 6, 2000, pp. 1-12. XP002205209.*

Kenyon C et al: "Stochastic Models for telecom commodity prices", Computer Netorks, Elsevier Science Publishers B.V., Amsterdam, NL, vol. 36, No. 5-6, Aug. 2001. pp 533-555. ISSN: 1389-1286.*

* cited by examiner

METHOD AND DEVICE FOR CALCULATING A FORWARD PRICE FOR USING LINKS IN A NETWORK

TECHNICAL FIELD

The invention relates to a method and a device for calculating a joint distribution of forward prices for using links in a network. In particular it relates to a method and device making a decision based on a derived forward price.

BACKGROUND OF THE INVENTION

Derivatives, especially derivatives of forward contracts, are important for risk management and hedging. However there is currently no method available to price contingent claims where the underlying asset is a claim on some part of a network and taking into account properties of forward prices on networks, specifically geographical-(no)-arbitrage and the requirement that tradeable commodities (e.g. Forwards) should be Martingales (under an appropriate measure). Forward derivatives will be of larger importance for bandwidth than for many conventional commodities because bandwidth cannot be stored for later use whilst forward-based contracts are storable over their lifetime (creation to maturity).

A forward contract is a contract entered into at a given time for certain delivery at a later point in time, the contract maturity T. The price of a forward contract is often denoted by $F(0,T)$ when it is entered into and denoted by $F(t,T)$ at later times where $t>=0$ and $t<=T$.

A forward curve at any time t is a set of prices of forward contracts of different maturities. For example a forward curve at time t for maturities between t and $T^*$ (where $T^*>=t$) comprises all the forward prices $F(t,T)$ with such that $T>=t$ and $T<=T^*$.

Bandwidth is becoming commoditized and markets are starting to appear. Potential behaviors of these markets are not understood because these markets are still in the early stages of development. The instruments traded on bandwidth markets, mostly over-the-counter (OTC), are typically forward contracts covering long (months to years) periods. This is partly due to inefficient negotiation and contract settlement mechanisms. New switching technologies, public pooling, and interconnection points are expected to hasten automation towards more liquid bandwidth markets and shorter contract periods as well as the development of a spot market. Additionally, fiber swaps are not uncommon. Forward derivatives, especially forward call options, are expected to appear given their appropriateness for risk management. Call options on forwards provide the right, but not the obligation, to use capacity in the future starting at some fixed date for a given duration upon payment of some price agreed when the contract is established. These options may be of a European (decide on use only at maturity), American (decide on use at any time up to maturity), or other type (design to meet customer requirements). Swaptions between different network providers are developing together with more specialised instruments with unique applicability to a networked commodity. Point-to-point bandwidth capacity cannot be stored for later use and so forward contracts are the primary market instruments, as in other commodity markets including electricity.

Today, there is no suitable forward curve model that takes into account the special characteristics of bandwidth as a tradable commodity. Standard models cannot be blindly applied because they generate geographical arbitrage opportunities since they do not take into account alternative paths between points with equivalent quality of service (QoS).

Hence a model of the forward curve to price a particular set of forward-derivative contracts will be highly useful both for comparing different forward contracts and for valuing derivatives. A forward contract is defined as a contract in which capacity is bought today to be used starting at a fixed date in the future and for a fixed duration. As indicated, conventional forward curve models developed are insufficient because they do not include the network structure of the bandwidth market. That is, alternative routes with equivalent quality of service (QoS) are perfect substitutes. This has been shown to greatly affect spot price development.

There is a need for a multi-factor forward curve model that takes into consideration geographical arbitrage terms and desired properties such as the Martingale structure. The model should allow the calculation of a distribution of forward prices for using links in a network.

This patent application is related to another patent application, entitled "METHOD AND DEVICE FOR CALCULATING A PRICE FOR USING A SPECIFIC LINK IN A NETWORK" filed on 18 Apr. 2001, presently assigned to the assignee of the instant application and the disclosure of which is incorporated herein by reference.

SUMMARY AND ADVANTAGES OF THE INVENTION

According to one aspect of the present invention there is provided a method for calculating in a network that comprises links a joint distribution of forward prices for using the links in the network. The method comprises the following steps:
a) a provision step for providing an observed forward price of a forward contract for each of the links,
b) a determination step for deriving from the observed forward prices a proposed joint distribution of forward prices by applying a forward pricing process to each of the links, thereby generating a geographical arbitrage in the network;
c) an arbitrage reduction step for reducing the geographical arbitrage in the proposed joint distribution of forward prices by a geographical arbitrage reduction value;
d) a verification step for verifying if the proposed joint distribution of forward prices together with the observed forward prices has a defined property in response to the determination step and the arbitrage reduction step;

if the verification step results in the defined property being not present
e) a generation step for generating a property reduction value; repeating the determination step, the arbitrage reduction step and the verification step, applying the property reduction value to the forward pricing process of each of the links.

An advantage of the method is that it enables derivative contracts to be consistently priced to market expectations, as these can be expressed through forward curve statics and dynamics. A single forward price for a specific link within the network can easily be derived from the joint distribution of forward prices.

The verification step can comprise a detection of a difference from the defined property of the proposed joint distribution of forward prices together with the observed forward prices and a decision step for deciding whether or not the detected difference satisfies a defined criterion. The defined criterion can comprise a predefined threshold. This allows to fine tune the result of the joint distribution of forward prices.

For satisfying the defined criterion the method can comprise a difference reduction step for minimizing the detected difference by applying to the forward pricing process of each of the links a property reduction value.

In an preferred embodiment, the steps of the method are repeated from the determination step to the decision step. This can be done until a satisfying result in view of the defined criterion, i.e. the predefined threshold, is reached.

When the defined property is a Martingale, and the forward prices are appropriately discounted, for example by using an appropriate yield curve, then the advantage occurs that the result matches market behavior as expected for tradable instruments.

Forward curves result from repeating the given method for forward prices of a range of forward price maturities.

The method for calculating a joint distribution of forward prices, also referred to as forward curves, for using links in the network has the following properties:

The specific nature of bandwidth is considered, i.e. it is a network-based commodity. Observed forward prices can be used as an input. Geographical arbitrage can occur due to the fact of multiple possible paths with equivalent quality of service (QoS). Arbitrage across time for the forward prices themselves is also considered by insisting that the discounted forward prices are Martingales under an appropriate discounting and measure.

In general, the method takes as basis or input a graph of traded forward contracts reflecting indivisible point-to-point bandwidth capacity on the underlying network. The forward prices are initially modeled as independent for each link of the graph by using a forward pricing process, such as the so-called process of Heath-Jarrow-Morton, Clewlow-Strickland [CS00], Manoliu-Tompaidis [MT99]. Brace-Gatareck-Musiela, or Jamshidian, Further, there are compensators added, as a geographical-no-arbitrage is imposed on forward prices at each time step and a time-no-arbitrage is imposed by adding a term whose value is such that the discounted forward price under risk neutral measure is, for example, a Martingale. The steps are repeated until a desired result is reached.

The advantage of this method of forward curve creation is that it enables pricing of derivative contracts taking into account the topology of the underlying networks.

Moreover, the method can be used for calculating functions of forward prices, i.e. derivative prices. Also possible is to use the method for calculating hedging strategies.

In accordance with a second aspect of the present invention there is provided a network-pricing device comprising:

a computer program product according to the method, a processor for executing the method, the processor having access to network information comprising for the network the observed forward price for each of the links.

Embodiments of this aspect of the invention therefore employ similar principles to embodiments of the first aspect of the invention.

REFERENCES

Clewlow and C. Strickland. Energy Derivatives pricing and risk management. Lacmia publications, London, 2000

Manoliu and S. Tompaidis. Energy futures prices: term structure model with kalman filter estimation, 1999. University of Texas at Austin, Center for Computational Finance preprint

DESCRIPTION OF THE DRAWINGS

Examples of the invention are depicted in the drawings and described in detail below by way of example only. It is shown in FIG. 1a an example of a network with three nodes and three edges, FIG. 1b forward prices on a triangular network example, FIG. 1c compensatory demand changes in general case for a more complex network, FIG. 2 a flow chart for the method of calculating a joint distribution of forward prices in the network according to FIG. 1a or 1b, FIG. 3 a further flow chart indicating the verification step in more detail, FIG. 4 the change in the property reduction value versus the side length ratio, FIG. 5 the change in magnitude of the property reduction value versus time, and FIG. 6 the percent change in volatility versus time with no geographical arbitrage and no compensators.

All the figures are for sake of clarity not shown in real dimensions, nor are the relations between the dimensions shown in a realistic scale.

DETAILED DESCRIPTION

Figure 1A:
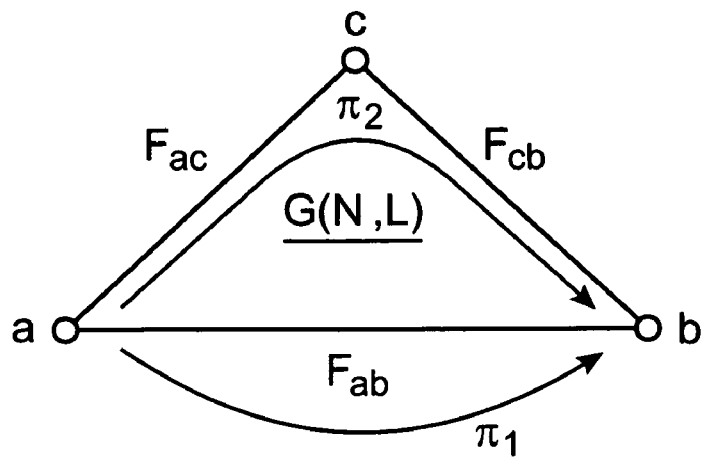

In FIG. 1a a network, also referred to as graph G(N, L) where N={a, b, c} are the nodes of the graph and L={ab, ac, cb} are the links between the nodes N, comprising a first node a, a second node b, and a third node c is depicted. The first node a is connected to the second node b via a first link ab. The first node a is connected to the third node c via a second link ac. The third node c is connected to the second node b via a third link cb. A first path $\Pi_1$ leads from the first node a to the second node b and comprises the first link ab. A second or alternative path $\Pi_2$ leads also from the first node a but to the second node b. This alternative path $\Pi_2$ comprises the second link ac and the third link cb. On each of the links ab, ac, cb, a corresponding forward price $F_{ab}$, $F_{ac}$, $F_{cb}$ is valid at a certain point in time, i.e. in the future, which bases on a forward contract. These forward prices $F_{ab}$, $F_{ac}$, $F_{cb}$ are the prices charged to a network user by a service provider, who may be the network owner or renter, for the service of providing at that point in time a specific amount of transport capacity on the corresponding link ab, ac, or cb for allowing transportation units over that link ab, ac, or cb. The network can be any transportation network, such as a street network, a mail delivery network, or as exemplarily selected here, a communication network. The units to be transported over the communication network are information units, e.g. data packets. A particular example could be data traffic over the Internet or a telecom network.

The bandwidth is a geographically distributed commodity and in real information networks the major long-distance suppliers form an oligopoly. For understanding the factors that influence the information-unit traffic and the pricing therefor in such a network, the following terms are addressed.

Geographical arbitrage: This means that, given equivalent quality of service (QoS), the cheapest of all available paths will set the end-to-end price in a competitive liquid market. This is due to the fact that the actual path is irrelevant with respect to information transport, as long as certain QoS requirements are met. The set of paths connecting two given geographical locations at the same QoS level are perfect substitutes.

Such arbitrage is not present in electrical networks because an electrical network is a whole and individuals do not have alternative paths except in the sense that aggregate can be logically divided in different ways. Thus an electricity network is a coherent whole, with energy according to well-understood laws of physics. The bandwidth market has no corresponding inherent large-scale feature. The requirement that supply and demand must balance in electricity leads directly to pool-type price discovery mechanisms. In data transmission, routing/switching protocols state the laws for the formation of flows. The choice of protocols and the possibility to combine several complementary technologies allow for a much higher degree of flexibility and control over data routing. This degree of control is indeed used for the design and operation of efficient data networks and obliviates any requirement for centralized pool pricing. Electrical power networks are a means of distribution of energy, with energy being the traded asset in the electricity market, whereas data networks are themselves the underlying of every bandwidth contract.

Non-storability: Inventories act to smooth variations in supply and demand. When no inventories exist, prices can jump if supply or demand changes suddenly. Prices can also change suddenly when the perception or expectation of the supply- or demand status suddenly changes. Bandwidth is non-storable. This has important technical and practical implications. This non-storability is the biggest difference from conventional commodities although that machinery remains very useful. The most important additional feature for modelling bandwidth, compared to other non-storable commodities, comes from the network aspect in that, in general, several paths are available at a given quality of service between any two points. Non-storability is a determining factor in electricity price modelling. Jumps and especially spikes are observed due to weather events sometimes in combination with equipment failures. In fact, even in commodities where storage is possible, like oil, large-scale political events can cause jumps and spikes in the price.

This non-storability refers to the capacity delivered or used at any point in time, that is to the spot (or immediate use) commodity. Because this is non-storable it is not possible to directly derive forward prices from spot prices as is done for storable commodities. Thus for future delivery and use of bandwidth, forward contracts and their prices are the base elements of the market. These forward contracts are themselves storable since they exist from their creation date until their maturity. Thus they are tradeable contracts and their processes should be Martingales under an appropriate measure.

Liquidity: Currently the bandwidth market is less liquid than the electricity market or many other commodity markets. Trading-volumes are picking up and ongoing deregulation of the industry along with universal trading contracts will assist in reaching higher levels of liquidity. In any case, not all traded locations are expected to be equally liquid in the future.

Forwards and Futures:

By convention a forward contract is a transaction between two individuals whereas a futures contract is an exchange-traded instrument. Both contracts are for the future delivery of an asset at a fixed price agreed upon at the start of the contract. Because exchanges usually have margin requirements adjusted daily to reduce default risk, futures and forwards have different sensitivities to daily interest rate fluctuations. As interest-rate modelling is here not an objective, a deterministic risk-free interest rate is assumed. Thus forward and futures prices are the same, and the two terms are used interchangeably.

Assuming the context of a filtered probability space $\Omega$, with a real-world probability measure P and events $\Im(t)$ revealed over a time $0 \leq t \leq T^*$, prices of forward contracts $F(t,T)$ have maturities $t \leq T \leq T^*$, and trades occur in a fixed time interval $[0,T^*]$ where $T^*$ is a fixed time and $S(t)$ with $0 \leq t \leq T^*$ denotes the spot price. This is a usual setting for discussion of forward- and derivative pricing.

Term structure of volatility: In commodity markets in general one of the stylized facts is that there is more volatility in the short-term forward market than in the long-term forward market. It is also usual that for non-investment commodities this volatility does not asymptote to zero. In the bandwidth market, whilst in some very long term there may be stability, it appears more likely that in a reasonable planning horizon there are increasing levels of uncertainty. So far prices are continuously falling, with rare exceptions, but even if it is assumed that this trend will continue, there is significant uncertainty concerning the rate of decline, both on a global and local level.

Above some factors that influence the development of bandwidth forward prices in general have been described. In the following it is described how these factors combine to give specific models for traded commodities.

Futures Price Properties

A Martingale, referred to as M(t), is a stochastic process whose expected future value E is the same as its current value, i.e. for $t_s > t_1$, $$E[M(t_2)|\Im(t_1)] = M(t_1), \quad [1]$$

where $\Im(t_1)$ describes everything that is known up to $t_1$, including $M(t_1)$. Using the risk-neutral measure this means inter alia that the expected future value E is discounted back to the present. If this value E were not the same as the current value then there would be the opportunity for a certain win at no cost, i.e. an arbitrage opportunity. There are additional technical details to do with the fact that this only makes sense when the risk-neutral measure is unique.

Herein the primary traded commodities in the bandwidth telecom commodity market are futures contracts with fixed maturities. The prices of individual futures contracts over time are Martingales under the risk-neutral measure labelled Q and being equivalent to the real-world probability measure P, otherwise the futures market contains arbitrage opportunities. The risk-neutral measure is a construct used in the pricing of derivative contracts. This observation is independent of whether the asset on which the forward is written is storable or non-storable because the forward contract itself is storable.

In a more technical language, non-storability means that a spot commodity cannot be part of any self-financing strategy. This limitation means that a spot price process for a spot price $S(T)$ is really just the set of prices of forward contracts $F(T,T)$ at maturity. In this sense the spot price process does exist and is observable. The prices of forward contracts $F(T,T)$ at maturity, for any maturity $0 \leq T \leq T^*$, are equivalent to the spot prices $S(T)$, at that time—they are both the price S at the time T for delivery at the time T. It is assumed that the delivery of the forward assets is defined in the same way as the delivery of the spot assets. Also, $F(T,T)$, $0 \leq T \leq T^*$, need not be a Martingale because it is non-storable. For non-storable commodities the equivalence between F(T,T) and S(T) is complete.

Futures/Spot (non-)Linkage

For storable investment commodities, the conventional relationship between spot- and forward prices is given by comparing forward prices with the strategy of buying the spot and holding it to maturity of the forward to arrive at $$F(0,T) = S(0)e^{(r+u-y)T}, \quad [2]$$

where S(t) is the spot price at a time t; r is the (constant) interest rate; u are the storage costs, taken as a fixed proportion of the spot price S, and y is the convenience yield or fudge factor required to make both sides equal. The fudge factor y is generally rationalised as the benefit from actually holding the commodity, e.g. the ability to benefit from temporary increases in the spot price S, also called shortages. The factor y is often termed the convenience yield for this reason. A more sophisticated understanding of this term is to do with long- and short-term price dynamics. This relationship does not hold when the underlying asset is non-storable because the relationship is based on storage arguments.

European Futures Options and Derivatives

Futures options are relatively simple to price and herein futures call options will be considered. At maturity, the payoff from a European futures call option is max(F(T,T)−X,0) where X is the strike price, and F(T,T)≡p(T) so also the payoff is equal to max(S(T)−X,0). S(T) is not required to be a Martingale, although F(t,T) is with respect to t but not with respect to T. So in effect the futures call option can be treated as a call option on the spot. The Black-Scholes option-pricing formula is not valid here because it assumes storability of the spot market asset. Equivalently the Black futures-option formula assumes log-normality of the futures price distribution, which in general, owing to the network effects, will also not be valid.

Now Q is the risk-neutral measure, and it is assumed that this exists and is unique. From the definition of the risk-neutral measure Q in general, follows $$E_Q[F(T,T)]e^{-rT} = F(0,T)e^{-rT} \quad [3]$$

because all investments—by definition—have the same expected return as the riskless rate under the risk-neutral measure Q. In other words, F(t,T) is a Martingale under the risk-neutral measure Q. Equation [3] is a definition of, or at least a constraint on, the risk-neutral measure Q. Which of the two it depends on other assumptions, especially the number of parameters in the stochastic process describing the forward price-development. The $e^{-rT}$ term on both sides allows to compare present values when the present values are taken at time zero.

In Equation [3] the price of the forward contract F(0,T) is observed today, i.e. at time zero, on the market. This price of the forward contract F(0,T) is the amount to be paid at the time T, wherein the term $e^{-rT}$ converts this to the present value today.

The risk-free rate of interest r is known, which is assumed to be constant, the maturity T of the price of the forward contract F is also known. F(t,t)≡S(t), so if one possesses a model for S(t) then one can calibrate that model to the market's expectation as expressed by Equation [3]. For example when the geometric Brownian motion dp/S=μdt+σdW is used to describe stock prices, this calibration process results in the stock price drift term μ being replaced by the risk-free rate of interest r. After having calibrated S(t) to the market's expectations, i.e. choosing the risk-neutral measure Q such that the Equation [3] holds, the expected price of a call option on a futures contract F with the strike price X is defined by $$E_Q[\max(F(T,T) - X, 0)] \quad [4]$$

$$\equiv E_Q[\max(S(T) - X, 0)]. \quad [5]$$

Here it is not yet proposed a form for the price S(t), which is vital to these equations and the option pricing. So far all network effects, i.e. geographical arbitrage, have been hidden inside S(t).

Geographical arbitrage is the term used to describe the fact that at a given QoS there may be many equivalent routes between two locations and that the direct route may not always be the cheapest. The difficulty of discovering an alternate and cheaper route leads to possible arbitrage opportunities together with the dynamic nature of link prices. These arbitrage opportunities can be observed using pseudo-polynomial algorithms for their detection. Equation [4] may be generalised to obtain the spot price S of any contingent claim C(0) that depends only on the distribution of the forward contract F(T,T), some set of deterministic parameters D and is European style i.e. is exercised only at T:

$$C(0, D) = E_Q[C(F(T, T), D)] \quad [6]$$

$$\equiv E_Q[C(S(T), D)]. \quad [7]$$

Non-storability, as described above, breaks the link between the spot price S(0) and the price of the forward contract F(0,T) thus one cannot go directly from spot prices today to futures prices today and then to futures options. This means that futures are traded commodities in their own right as this is the way to assure future bandwidth and leads to Equation [4].

It has been shown how to price European-style contingent claims on futures contracts of the same maturity. This involves calibrating the spot price process, which represents a non-storable commodity to the market-observed futures price, a Martingale under the risk-neutral measure Q. The spot price process explicitly includes network effects, notably those from geographical arbitrage, and the markets' response to such conditions through load-balancing. For a European call option on a 10 month forward, it is found that the option prices are independent of the networks considered although the presence of geographical no-arbitrage requires different calibration parameters for different network topologies.

Above the focus is on European-style contingent claims so it was not necessary to model the forward curve development explicitly because one could rely on F(T,T)≡S(T) at maturity. To model more general instruments such as swing options, forward curve modelling would be used.

Even with European-style forward options forward curve dynamics are useful in providing the means to interpolate between different instruments with different maturities and characteristics. Forward curve dynamics may also be used for extrapolation to new situations even within the European-style context. For example if one has the volatility of a forward contract at one maturity a forward curve model provides a means to extrapolate to other maturities. The pricing of arbitrary contingent claims (e.g. American-style options) uses explicit modelling of forward price curve dynamics, i.e. dF(t,T) with respect to t. This modelling is non-trivial because then $F_{ab}(t,T)$ for each link ab should be a Martingale and the forward contract graph G(N, L) as a whole should also have no geographical arbitrage. It is not sufficient to simply take a forward curve model without modification from the literature and apply it. These models would have $F_{ab}(t,T)$ as Martingales but then corrections for geographical arbitrage would be required which would remove the Martingale property. This property would then have to be restored as this is shown in detail in the following.

Network Model

The bandwidth trading market can be represented by the forward contract graph G(N, L), where N={a, b, c} are the nodes of the graph and L={ab, ac, cb} are the links between the nodes N. A link in the forward contract graph G(N, L) represents an indivisible traded forward contract for bandwidth between two nodes. The forward contract is an agreement between a supplier and a buyer, whereby the buyer agrees to pay a specific forward price F and the supplier agrees to in exchange supply a specific network capacity to the buyer in the future (called the maturity of the forward contract). It should be noted that each maturity gives rise to a, potentially different, forward contract graph. A standard agreement or contract is, for example, for DS3 45 Mb/s capacity with defined delay, jitter, packet loss, etc. and several time-scales of contracts are available with standardized starting times, e.g. every 15 minutes, hour at :00, days at 00:00, and lengths. This degree of liquidity is not yet present or at least not yet widely observed for bandwidth trades but, considering how electricity markets developed, may be an eventual situation. Nodes N are public pooling or interconnection points where many carriers are present with the capability to arbitrarily cross connect between networks (several of these have already been deployed worldwide). Thus paths may be assembled in a supplier-neutral manner.

Bandwidth is offered for sale on the market in the form of point-to-point forward contracts that will generally comprise several underlying links L at the network or physical layer. Thus, the forward contract graph G(N, L) is an abstract view of network connectivity at the level of traded contracts, and links/paths L/Π, in the forward contract graph do not map one-to-one to physical or network layer links/paths.

The forward contract graph abstraction is useful for studying the network effects inherent in a bandwidth market. That is, forward curve development on any link L is not independent of the forward curves of neighboring links as there is generally more than one way to connect two locations and buyers will choose the cheapest path if the other factors are equal (e.g. QoS).

The Forward Curve Model in General

Assumed is in the risk-neutral measure throughout a start at the individual link level from a multi-factor model proposed for electricity where n Brownain motions $dW_i$ with magnitudes, i.e. variances, $\sigma_i^2$, drive the following forward curve:

$$dF = F \sum_{i=0}^{i=n} \sigma_i dW_i \quad [8]$$

with the boundary condition that F(t,t)=S(t), where S(t) is the spot price at a time t. It was remarked above that this identity does not necessarily add any useful information. This does include the possibility that spot prices are mean reverting. Now by a change of variables using Itô's lemma this implies that:

$$d(\log F) = \sum_{i=0}^{i=n} -0.5\sigma^2 dt + \sigma_i dW_i \quad [9]$$

Jump terms could be added to either Equation [8] or [9] of either Markov or non-Markov nature. However, for simplicity of exposition these are here left out. Now it is added in two further terms to deal with geographical arbitrage and the Martingale structure:

$$d(\log F(t, T)) = \sum_{i=0}^{i=n} (-0.5\sigma(t, T)_i^2 dt + \sigma(t, T)_i dW_i) + adA - \beta(t, T)dt \quad [10]$$

T stands for the maturity of a forward contract, i.e. when the contract is physically delivered or the service starts. t basically indicates the current time.

dA is non-zero whenever there is a geographical arbitrage opportunity, i.e. another route or routes are cheaper, and acts to remove that opportunity with a speed indicated by α the liquidity factor. A geographical arbitrage reduction value adA is also referred to as a first compensator. This implies that the forwards will not be martingales and this property is restored by a property reduction value β(t,T)dt also referred to as a second compensator. It is clear that the optimum of a reduction is a compensation.

The addition of these last two terms, i.e. the first and second compensator, serves to preclude any analytic solution and thus it is relied on numerical investigations. The reason for this is that the dA term requires comparison of all alternate routes and this is generally an np-complete or at least pseudo-polynomial calculation. Additionally the addition of the second compensator changes the behavior of the first and vice versa. Thus these should be calculated in an iterative manner or more precisely as the solution of:

$$\min_{\beta(t,i,j)} g(E[F(t, T, i, j)] - F(0, T, i, j)) \quad [11]$$

where g(E[F(t,T,i,j)]−F(0, T,i,j)) is a specified error metric that combines contributions across time and across different links in the forward contract graph G(N, L) and i,j are elements of a set of nodes a, b, c. F(0,T,i,j) is the forward curve for a link i,j in the contract network. Equation [11] is an infinite-dimensional minimization problem in general, in fact it is at least Ln where n is the number of links. However, for many choices of functional forms for F(t,T) and g( . . . ) this will collapse to a low dimensional minimization. In fact one can incorporate this minimization with each simulation time-step. In the case of a triangular topology this indicates one 3-dimensional, but single valued, minimization at each step. One could, for example, use a sum of absolute errors error criterion with a tolerance some proportion of the time-step and the side lengths (prices).

Some practical details should clarify how to obtain β. It is considered a single time step Δt, with start from F(t,T) for each link of the contract graph and the wish to obtain the joint distribution of F(t+Δt, T) for the contract graph. Equation [10] discretizes for each link of the network to $$d(\log F) = \sum_{i=0}^{i=n} -0.5\sigma^2 \Delta t + \sigma_i \varepsilon_i \sqrt{\Delta t} + adA - \beta \Delta t \qquad [12]$$

Where $\epsilon_i$ are standard Normal random variables. Thus one may choose how many realizations, i.e. elements, of a proposed joint distribution of forward prices to create.

For example suppose it is wanted to create n samples from the proposed joint distribution of forward prices. First one would apply Equation [10] to each network link to create a single sample comprising one possible future forward price for each link. This is repeatable n−1 further times to obtain a total of n samples from the proposed joint distribution of forward prices.

For each link of each sample one should then calculate its first compensator adA to remove the geographical arbitrage when it is present relative to that sample. This may be accomplished as follows.

Geographical Arbitrage Removal

Figure 1B:
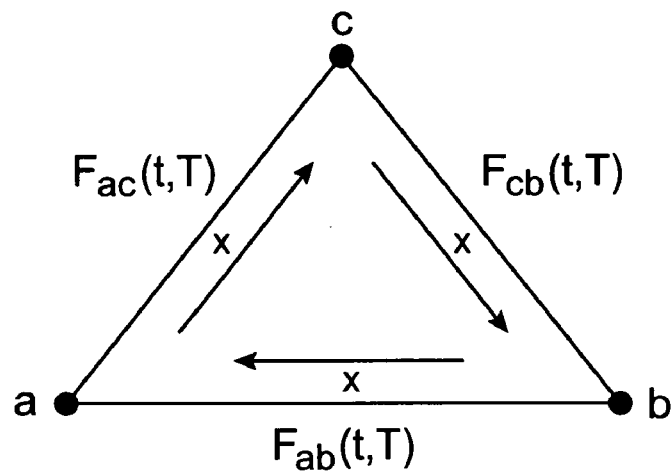

FIG. 1b illustrates forward prices F(t,T) on each side of a triangular network similar to FIG. 1a. Now consider a forward price F for each side at some time t, all with the same maturity T, i.e. $\{F_{ab}(t,T), F_{ac}(t,T), F_{cb}(t,T)\}$. Having for the first link ab:

$$F_{ab}(t,T) > F_{ac}(t,T) + F_{cb}(t,T) \qquad [13]$$

and having equivalent quality of service (QoS) between the first link ab and the other links ac, cb then there is a geographical arbitrage situation. Unlike the usual usage of the term "arbitrage" in mathematical finance this does not mean that unlimited advantage can be constructed because short selling possibilities in this market are very limited. A "no-geographical-arbitrage" situation does not imply that Equation [13] holds with equality. The possibilities for advantage are strictly one-sided. However if Equation [13] holds then demand (traffic) will shift from the direct path, i.e. the first link ab, to the alternative path, i.e. the other links ac, cb. This shift in demand will cause changes in prices according to the supply and demand elasticities for these forward prices F(t, T). It is likely that these elasticities will not be constant across maturities but will approach those for spot contracts as maturities decrease. Also, unlike spot elasticities, forward elasticities have no dependence on physical switching technologies.

In FIG. 1b assuming that Equation [13] holds then demand will shift until this hold only with equality. Suppose that the shift of demand is x and the price elasticities are $e_{ij}(t,T)$, then at equality having:

$$F_{ab}(t,T) - xe_{ab}(t,T) = F_{ac}(t,T) + xe_{ac}(t,T) + F_{cb}(t,T) + xe_{cb}(t,T). \qquad [14]$$

Hence $$x = \frac{F_{ab}(t,T) - (F_{ac}(t,T) + F_{cb}(t,T))}{e_{ab}(t,T) + e_{ac}(t,T) + e_{cb}(t,T)} \qquad [15]$$

Thus one can calculate the price changes required to remove geographical arbitrage opportunities. These form the first compensator adA in Equation [10]. Equation [10] is in terms of the logarithms of the forward prices F(t,T) and so the corrections calculated here should be suitably transformed.

Figure 1C:
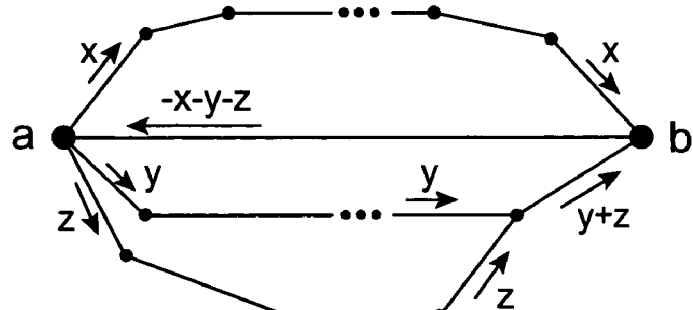

In general there may be many, non-disjoint, alternative paths as shown in FIG. 1c. The no arbitrage conditions are:

$$F_i(t,T) + e_i(t,T) \left( \sum_{k=1, k \neq i}^{k=|G|} \sum_{\zeta=1}^{\zeta=|\Lambda_k|} x_{k\zeta} I(i, \Lambda_{k\zeta}) - \sum_{\lambda=1}^{\lambda=|\Lambda_i|} x_{i\lambda} \right) \leq \qquad [16]$$

$$\sum_{\xi \in \Lambda_{im}} \left( F_\xi(t,T) + e_\xi(t,T) \left( \sum_{k=1, k \neq \xi}^{k=|G|} \sum_{\zeta=1}^{\zeta=|\Lambda_k|} x_{k\zeta} I(\xi, \Lambda_{k\zeta}) - \sum_{\lambda=1}^{\lambda=|\Lambda_\xi|} x_{\xi\lambda} \right) \right),$$

$$x_{im} \geq 0, \forall m = 1, \ldots, |\Lambda_i|, \forall i = 1, \ldots, |G|$$

Where:

|G| is the number of links in the graph G $\Lambda_i$ is the set of alternative simple paths between the ends of link i i.e., $\{\Lambda_{i1}, \ldots, \Lambda_{i|\Lambda_i|}\}$ $x_{ij}$ is the flow from link i to alternative simple path j $\Lambda_{ij}$ is the set of links of the alternative simple path j of link i.

I(j,K) is the indicator function which is 1 if j is in the set K and 0 otherwise A simple path is one with no repeated links. The no arbitrage conditions are linear and can be rewritten in general in the form:

Minimize $\Sigma x$ such that $Ax \leq b$ $x \geq 0$ where the matrix A encompasses all alternative paths and the constraint x>=0 picks out which ones are used. A and b are constructed from the equations above. This is the form of a standard linear optimization problem for which well know methods exist. However it is unnecessary to compute all alternative paths since the following heuristic algorithm suggests itself. Basically, the direct link against all the rest (previously discovered plus new path), at each step is balanced. After each iteration a new path is added to the list of paths to be balanced, but the state of the graph is not altered so that the new load-balancing step will be executed as if no change had been made. In other words, it is load-balanced at each step with the sole purpose of discovering the next cheapest path. Only when no new cheapest path is found the state of the graph is updated. This is carried out for each link and then a proportion e of all the corrections are used and then this is repeated until there are no more corrections.

Algorithm: $\epsilon$-Iterative No-Arbitrage

The following describes an $\epsilon$-Iterative No-Arbitrage algorithm in detail.

[start of algorithm]
Given: a graph G of link prices, find the price changes G" which will remove all geographical arbitrage opportunities. Choose $\epsilon$ where $0 < \epsilon < 1$ and repeat the following until G"=0.
begin
    Let G"=0, the graph G with all link prices set to zero.
    For each (direct) link $\pi_d$ in G.
    begin
        Let the price of the direct link, $\pi_d$, be $p_d$
        Let E=0.
        Let G'=G,
        Repeat
        begin
            1. Find the cheapest alternative path in G' to $\pi_d$.
            2. Suppose that this path cost is $p_c$ and the path is $\pi_c$
            3. If $p_d \leq p_c$ then break (no cheaper path remains)

-continued

```
    4. E=E + π_c
    5. load balance in G' between π_d and E
    6. Let p_d be the price of π_d in G'
  end
  G'' = G'' + ε (G' - G)
 end
 G=G+G''
 If G''=0 break because you have finished
end
```

[end of algorithm]

This algorithm is run at each time step to obtain the no geographical arbitrage reduction dA. In fact this is an iterative algorithm which is exact when the load balancing effects from different geographical arbitrage opportunities do not overlap (e.g. for triangular networks which can only support a single opportunity at a time). When there is overlap this over compensates on the common links. Thus this algorithm is run in an iterative fashion and each time only a proportion ε of the corrections are accumulated and used. As ε→0 this solution will converge towards one that considers all the links and their alternative paths simultaneously for the geographical arbitrage removal.

Martingale Property Restoration

Then one gets a proposed joint distribution of forward prices $F^*(t,T)$ that can be expected not to have the Martingale property. One can obtain this by the introduction of the second compensator $\beta(t,T)\Delta t$. This is calculated relative to the particular set of realizations of the standard Normal random variables $\epsilon_i$ that are used. Thus this gives a value of the second compensator $\beta(t,T)\Delta t$ appropriate to these realizations.

The second compensator $\beta(t,T)$ can be generated in the following way and applied within a difference reduction step. First generate an error metric, also referred to as difference D, which describes the magnitude by which a defined property M, e.g. Martingale, does not hold as a single value or number. For example the difference D could be the sum of the absolute values of the differences between the actual values and the values that would be present if the defined property M held. Now there is present the required setup for a single-valued but multi-dimensional minimization algorithm, that is the difference reduction step. That is, there is an error that one desires to reduce that is the function of some parameters, the second compensator $\beta(t,T)$ for each link, that one can change. Of course, with each value of the second compensator $\beta(t,T)$ generated by the minimization one removes geographical arbitrage again but this is invisible to the minimization because this is just part of the evaluation of the difference D. There are many different minimization algorithms available. Amoeba, otherwise known as Simplex, has been used from Numerical Recipes in C, 2nd Edition. Any minimization algorithms that does not require derivatives could be tried. However Amoeba worked for the examples and is easy to implement. This is a minimization of a stochastic function because the generation of the realizations of the Normal random variables or other random driving terms is random. The best way to tackle this minimization of a stochastic function is to keep the random driving terms the same whilst the minimization is taking place and then to repeat the minimization several times in order to build up statistical estimates of the second compensator $\beta(t,T)$. The average of the second compensator $\beta(t,T)$ can then be used subsequently.

In order to form a more complete picture of the second compensator $\beta(t,T)\Delta t$ there are three choices. One can: increase the number of realizations in order to have a fuller picture of the joint proposal distribution; one could re-sample from the realizations already generated and repeat; or one could repeat the whole process with a new set of realizations. The third choice is the preferred one because it provides an excellent method of obtaining error estimates for the value of the second compensator $\beta(t,T)\Delta t$. It is mentioned that even if, say analytically, the correct value of the second compensator $\beta(t,T)\Delta t$ is known, the properties of any sample estimate of the joint forward distribution will be statistical in nature.

First geographical arbitrage is removed and then it is checked whether a defined property M, e.g. Martingale, holds. If it does not hold then one changes the value of the second compensator $\beta(t,T)$ and then use the forward price process from the previous starting points (F(t,T)). Then any geographical arbitrage is removed and again it is checked whether the required property holds.

Figure 2:
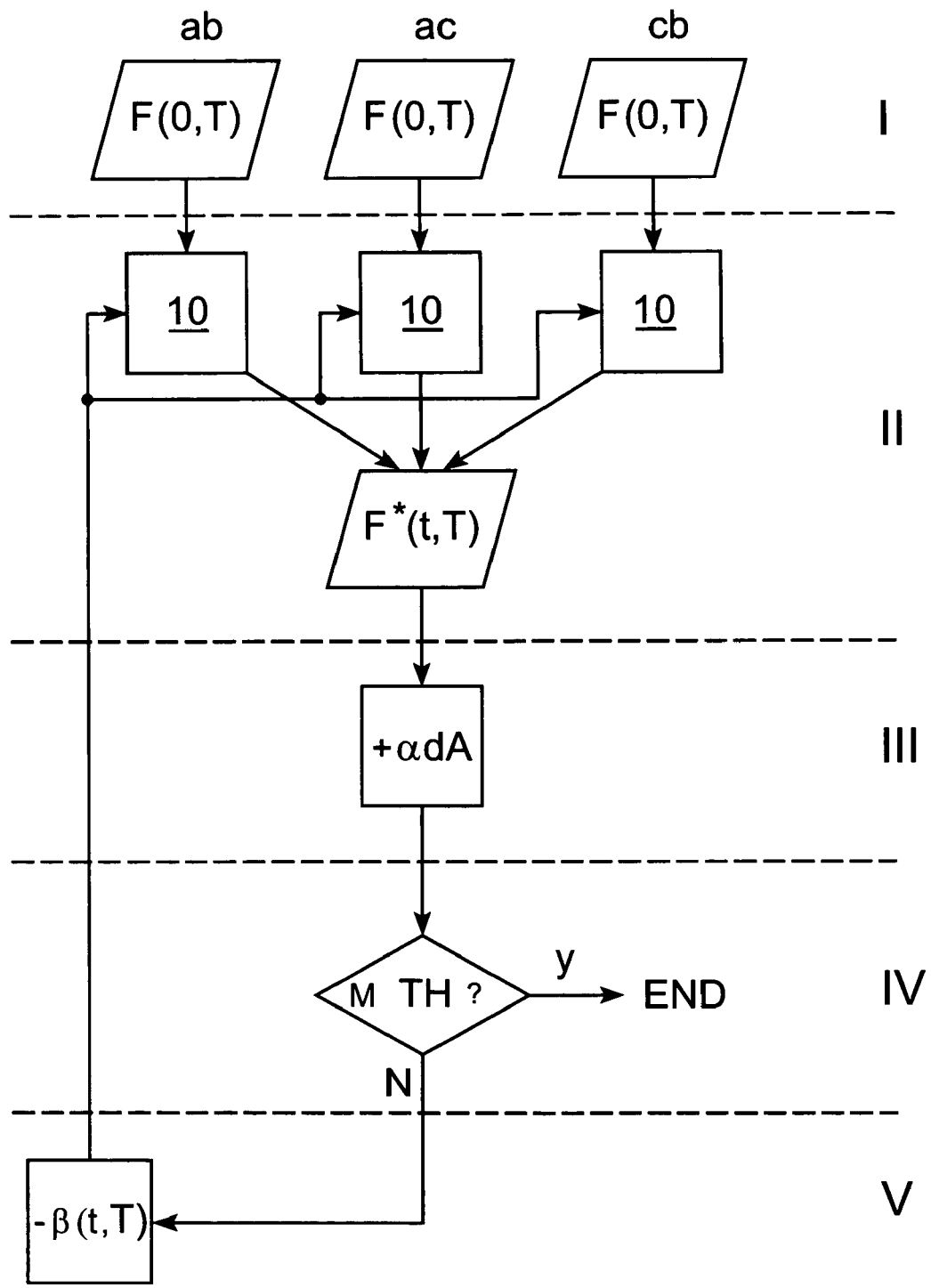

In FIG. 2, a flow chart for an algorithm for calculating the joint distribution of forward prices F(t,T) in a network, as the ones depicted in the FIGS. 1a and 1b, is shown. For each link ab, ac, cb an observed forward price F(O,T) of a forward contract is known, as indicated by a provision step I. This means here in detail that to each link ab, ac, cb a forward price, $F_{ab}(0,T)$, $F_{ac}(0,T)$, $F_{cb}(0,T)$ respectively, is provided. For each such link ab, ac, cb a determination step 1I for deriving from the observed forward price F(O,T) a proposed joint distribution of forward prices $F^*(t,T)$ by using a forward pricing process 10 to each of the links ab, ac, cb is performed. The forward pricing process 10 can be a process according to Heath-Jarrow-Morton. It should be noted that the Heath-Jarrow-Morton process is not applied directly as it is intended for interest rate modeling but in a suitably adapted form, e.g. Clewlow-Strickland. By the determination step II geographical arbitrage is generated in the network.

As a next step follows an arbitrage reduction step III for reducing or better compensating the geographical arbitrage in each element of the proposed joint distribution of forward prices $F^*(t,T)$ by the geographical arbitrage reduction value adA, that is the first compensator.

Next, a verification step verifies whether or not the proposed joint distribution of forward prices $F^*(t,T)$ together with the observed forward prices F(O,T) has the defined property M in response to the determination step II and the arbitrage reduction step III. At this point the method can end if the defined property M is fulfilled. If the verification step IV shows that the defined property M is not present a generation step V generates a property reduction value f, (t,T)dt. The determination step II, the arbitrage reduction step III and the verification step V are repeated by applying the property reduction value $\beta(t,T)dt$ to the forward pricing process 10 of each of the links ab, ac, cb. The property reduction value $\beta(t,T)dt$ is generated in the generation step V by applying the difference D to modify the previous property reduction value $\beta(t,T)dt$.

Figure 3:
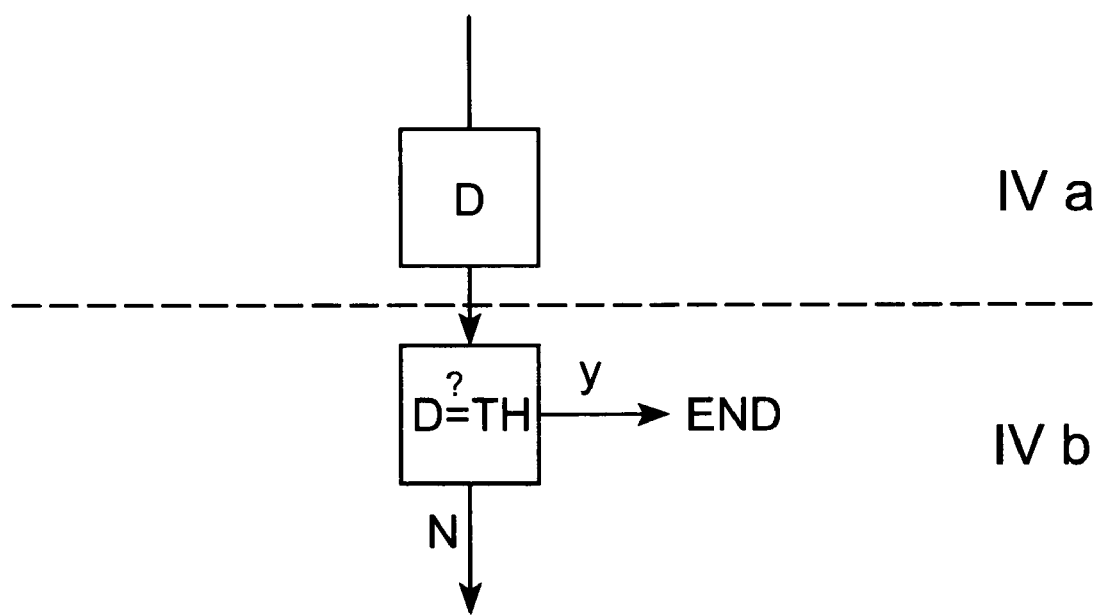

As shown in more detail in FIG. 3, the verification step IV comprises a detection step IVa for detecting the difference D from the defined property M of the proposed joint distribution of forward prices $F^*(t,T)$ together with the observed forward prices F(O,T). There follows a decision step IVb for deciding whether or not the detected difference D satisfies a defined criterion TH, i.e. a predefined threshold. At this point the method can end, as indicated in general above. In order to satisfy the defined criterion TH the difference reduction step for minimizing or reducing the detected difference D is performed by adding to the forward pricing process 10 of each of the links ab, ac, cb the property reduction value $\beta(t,T)dt$, that is the second compensator, as indicated above and the previous steps are repeated beginning at the determination step II again. The difference reduction step is indicated in FIG. 2 by the loop. The second compensator β(t,T)dt is a function of the difference D and its previous values. It may be initialized for the first time at zero.

As the method runs in a loop by repeating the steps from the determination step II until and end in the decision step IVb is reached, a well calculated result of the joint distribution of forward prices F(t,T), i.e. the result having a desired accuracy, can be achieved. From the joint distribution of forward prices F(t,T) a single forward price for a specific link can be derived.

Furthermore all the steps can be repeated in order to obtain a set of estimates of the second compensator β(t,T)dt. From this set of estimates an estimate of the average value of the second compensator β(t,T)dt and the confidence limits of this estimate can be calculated.

In the following example a set of forward contracts comprising observed forward prices F(O,T) with a single maturity, 1 year, for bandwidth that form a triangular forward contract graph G(N, L), as depicted in FIG. 1a or 1b, is considered. That is any two forwards are equivalent, in terms of QoS and service provided, to the third. However they do have different prices and it is the evolution of these prices that is considered.

Figure 4:
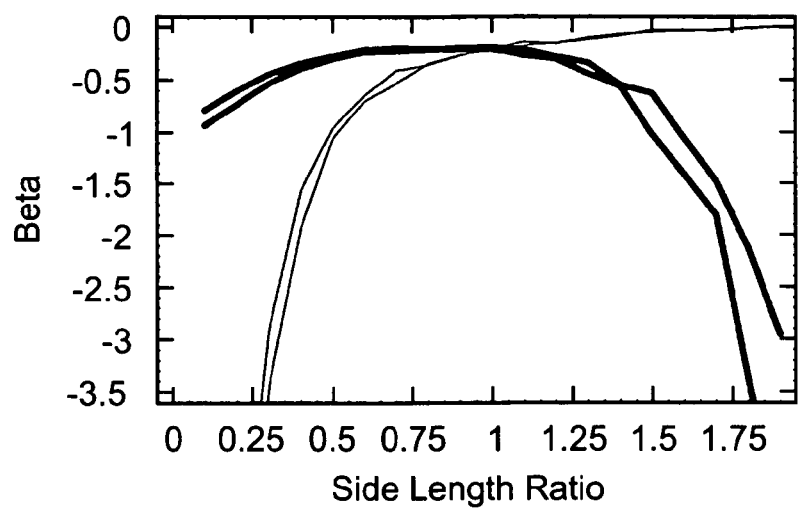

FIG. 4 shows the change in the second compensator β(t,T) versus the side length ratio. The heavy lines indicate fixed sides whilst the light lines indicate the variable length side. Pairs of lines represent trading granularity, either daily or 1/10 daily, i.e. 252 steps of 2520 steps to make up 1 year. The sizes for different contract triangle shapes are considered where two sides of the triangle are the same price (side length) and the third is varied. This is with a highly liquid market, i.e. α=1, with an annualized volatility of 100% just at maturity with exponential decline prior to this. That is with a single-factor model with volatility function:

$$\sigma(t,T)=1.0e^{-1.0(T-t)} \quad [17]$$

To construct FIG. 4 it was used a single, constant, value of the second compensator β for each side in order to demonstrate the dependence of this approximate compensator on Side Length Ratio and on the trading granularity. In practical use however the value of the second compensator β would be calculated at each time step and would not be constant over time. The use of a constant second compensator β for FIG. 4 is to demonstrate the two points described and is not a typical use.

From equation [17] it is clear that the second compensator β(t,T) cannot be constant, because geographical arbitrage opportunities are a function of volatility, and in general it will be a function of both t and T. For this case FIG. 5 shows the change in magnitude of the second compensator β(t,1.0) with time.

Figure 5:
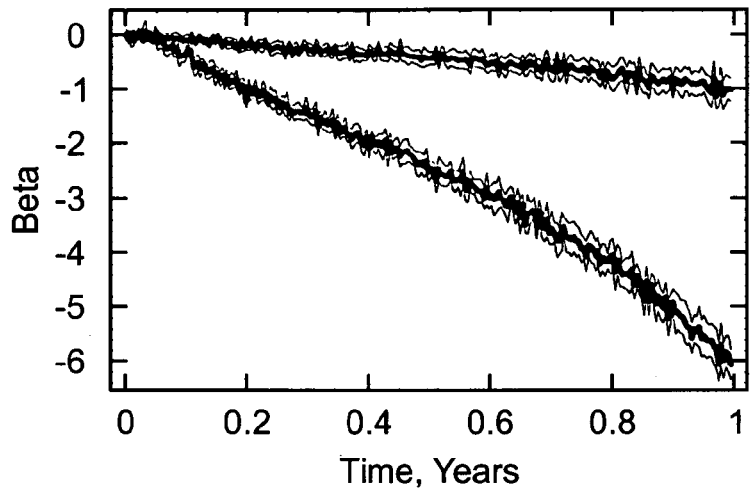
Figure 6:
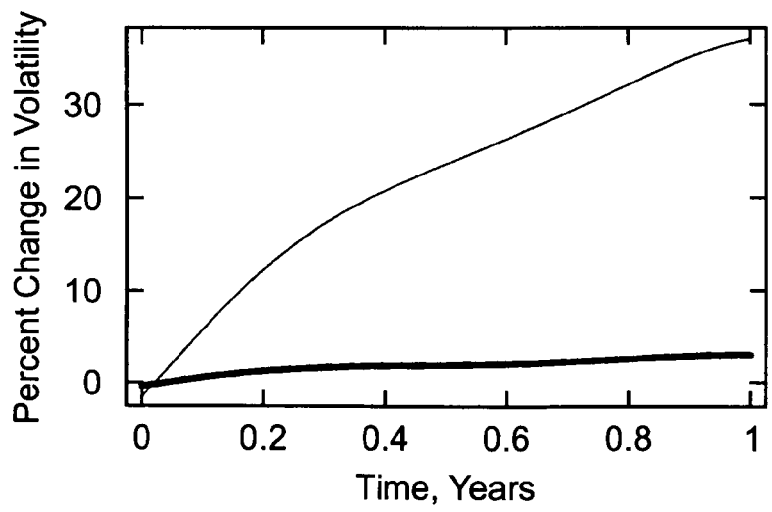

FIG. 5 shows the estimate of the second compensator β together with an estimated 95% confidence interval. More precisely, the figure shows the change in magnitude of the second compensator β(t,1.0) over time for triangular forward contract networks with price (side length) ratio 1/3:1:1 for 1-year maturity forward contracts. The upper trio of lines indicates the fixed sides while the lower trio of lines indicates the variable length side. Each trio of lines comprises the estimate of the mean and the 95% confidence limits FIG. 6 shows the change in volatility of forward prices versus a model with no geographical arbitrage reduction and no other compensators. That is for side (price) ratios of 1/3: 1:1 and equation [10] with the second compensator β(t,T) and the first compensator adA relative to a situation without these last two terms. The short side has increased volatility with the effect increasing as time-to-live decreases. This increase is due to the combined effect of the load balancing when geographical arbitrage effects occur and the action of the compensator which preserves the Martingale property. The heavy line indicates the fixed sides while the light line indicates the variable length side.

The described embodiments are combinable in part as well as in whole. It is obvious for the person skilled in the art that the present invention can be realized in hardware, software, or a combination of these. Also, it can be implemented in a centralized fashion on one single computer system, or in a distributed fashion where different elements are spread across several interconnected computers or computer systems, whereby any kind of a computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

Any disclosed embodiment may be combined with one or several of the other embodiments shown and/or described. This is also possible for one or more features of the embodiments. It is obvious that a person skilled in the art can modify the shown arrangements in many ways without departing from the gist of the invention which is encompassed by the subsequent claims.

The invention claimed is:

1. A method for calculating, in accordance with a network that comprises links, a joint distribution of forward prices for using the links in the network, said method comprising:

a provision step performed via a computer system for providing an observed forward price of a forward contract for each of said links, wherein each of said links has respective bandwidth associated therewith such that the bandwidth is considered a tradable commodity for which the observed forward price is being provided;

a determination step performed via the computer system for deriving from the observed forward prices a proposed joint distribution of forward prices by applying a forward pricing process to each of said links, thereby generating a geographical arbitrage in the network, wherein the forward pricing process comprises one or more functions of: Heath-Jarrow-Morton, Clewlow-Strickland, Manoliu-Tompaidis, Brace-Gatareck-Musiela, Jamshidian;

an arbitrage reduction step performed via the computer system for reducing the geographical arbitrage in the proposed joint distribution of forward prices by a geographical arbitrage reduction value;

a verification step preformed via the computer system for verifying if the proposed joint distribution of forward prices together with the observed forward prices has a defined property in response to the determination step and the arbitrage reduction step, wherein the verification step comprises a detection step for detecting a difference from the defined property of the proposed joint distribution of forward prices together with the observed forward prices, wherein the defined property is a Martingale;

a decision step preformed via the computer system for deciding whether or not the detected difference satisfies a defined criterion, wherein the defined criterion comprises a predefined threshold;

for satisfying the defined criterion a difference reduction step for reducing the detected difference by adding to the forward pricing process of each of said links the property reduction value;

if the verification step results in the defined property being not present a generation step for generating a property reduction value;

repeating the determination step, the arbitrage reduction step and the verification step;

applying the property reduction value to the forward pricing process of each of said links;

deriving from the joint distribution of forward prices a forward price for a specific link;

deriving statistical estimates of properties of the property reduction value; and repeating the statistics step sequentially over time to obtain simulations of forward prices.

* * * * *